A. HETHERINGTON.
MICROMETER GAUGE OR CALIPER.
APPLICATION FILED JAN. 21, 1919.
1,425,201. Patented Aug. 8, 1922.
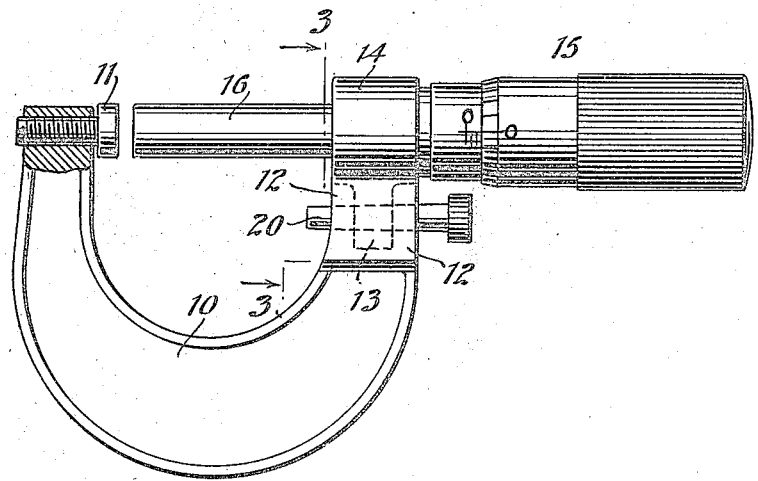
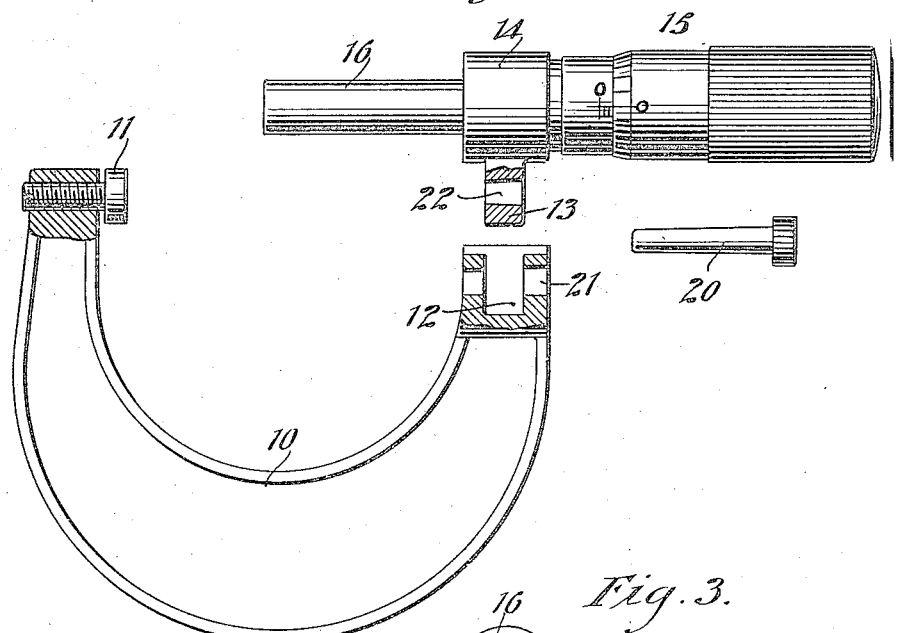
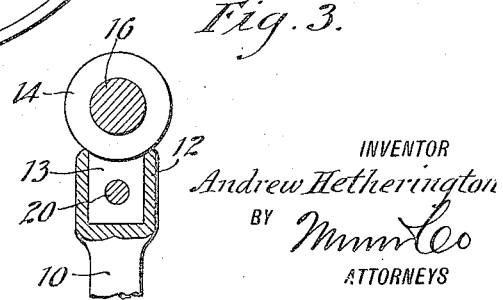
WITNESSES
INVENTOR
Andrew Hetherington
BY
ATTORNEYS

UNITED STATES PATENT OFFICE.

ANDREW HETHERINGTON, OF WEST HOBOKEN, NEW JERSEY.

MICROMETER GAUGE OR CALIPER.

1,425,201.  Specification of Letters Patent.  Patented Aug. 8, 1922.

Application filed January 21, 1919. Serial No. 272,283.

*To all whom it may concern:*

Be it known that I, ANDREW HETHERINGTON, a citizen of the United States, and a resident of West Hoboken, in the county of Hudson and State of New Jersey, have invented new and useful Improvements in Micrometer Gauges or Calipers, of which the following is a full, clear, and exact description.

The object of the invention is to provide certain new and useful improvements in micrometer gauges or calipers whereby the micrometer mechanisms are arranged for interchangeable use with U-shaped frames of different spans to provide a large range of measurement without requiring a number of micrometers for measuring articles of different sizes. Another object is to permit the use of a micrometer mechanism on different frames.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the improved micrometer gauge or caliper with part of the frame shown in section;

Figure 2 is a similar view of a micrometer gauge or caliper with the micrometer mechanism shown detached from the frame and the latter being of a different size and parts being shown in section; and Figure 3 is a cross section of the micrometer gauge shown in Figure 1, the section being on the line 3—3 of Figure 1.

The measuring instrument comprises a plurality of different sized U-shaped frames 10, as plainly shown in Figures 1 and 2, and each frame is provided at one end with an anvil 11 and at the other end with a socket 12 preferably of rectangular cross section and outline, and into which fits a lug 13 of the supporting body 14 of the micrometer mechanism 15 of any approved construction and having the usual micrometer screw 16 adapted to coact with the anvil 11 for measuring a desired article. The lug 13 projects from the annular supporting body 14 and is of less width than the diameter of the said body, so as to fit the socket 12, the end surface of the socket end of the frame being laterally concave as shown at 12' to fit the said body, while the lug is adapted to be fastened in the socket 12 by the use of a locking pin 20 passing through registering apertures 21 formed in the sides of the socket and an aperture 22 formed in the lug 13 of the supporting body 14. The locking pin 20 and the apertures 21 and 22 are preferably tapered to securely and firmly hold the supporting body 14 in position on the frame 10. In practice, the arrangement is such that the micrometer gauge or caliper shown in Figure 1 has a range from zero to say 1 inch, and when the micrometer mechanism 15 is detached from this frame and is attached to the frame shown in Figure 2 then this micrometer gauge or caliper has a range say from 1 inch to 2 inches. Thus by providing a number of frames 10 of different sized spans and using the same micrometer mechanism 15 with the frames any desired selection can be made according to the length of the work to be measured. Thus for articles under 1 inch the micrometer as shown in Figure 1 is used, and for articles of a length between 1 and 2 inches the frame 10 is used, as shown in Figure 1, with the micrometer mechanism 15 attached thereto for the time being.

I do not limit myself to the number of frames of different sizes that may be used for forming one set of micrometers having the same micrometer mechanism 15.

Having thus described my invention, I claim as new and desire to secure by Letters Patent:—

1. A micrometer gauge or caliper, comprising any one of a plurality of frames of different spans and each provided at one end with a substantially rectangular socket opening into said ends, the said sockets of the several frames being alike, a single micrometer mechanism having an annular supporting body provided with a rectangular lug adapted to fit and conform to the said socket of any one of said frames, said lug and socket end having coacting and registering tapered apertures, and a locking pin engaging the apertures of the lug and the socket in which the lug is inserted at the time to lock the body in place in the frame.

2. A micrometer gauge or caliper, comprising a substantially U-shaped frame provided at one end with a substantially rectangular socket, said end being concaved and the walls of said socket having opposed tapered apertures, a micrometer mechanism having an annular supporting body provided with a laterally extending lug of an outline corresponding to the outline of the socket and snugly fitting the latter and enclosed therein against turning, said concaved end of the frame fitting said annular supporting body, said lug also having a tapered aperture, and a tapered headed pin removably insertable in the apertures to detachably connect the frame and body.

ANDREW HETHERINGTON.